US010888818B2

(12) United States Patent
De Ren et al.

(10) Patent No.: US 10,888,818 B2
(45) Date of Patent: Jan. 12, 2021

(54) INTEGRATED MERCAPTAN EXTRACTION AND/OR SWEETENING PROCESSES COMBINED WITH THERMAL OXIDATION AND FLUE GAS TREATMENT

(71) Applicant: Honeywell International Inc., Morristown, NJ (US)

(72) Inventors: Jan De Ren, Bracknell (GB); William J. Whyman, Tulsa, OK (US); David A. Roman, Guildford (GB); Tom M. Jackson, Surrey (GB)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 16/561,717

(22) Filed: Sep. 5, 2019

(65) Prior Publication Data

US 2020/0222851 A1    Jul. 16, 2020

Related U.S. Application Data

(60) Provisional application No. 62/792,533, filed on Jan. 15, 2019.

(51) Int. Cl.

| *B01D 53/76* | (2006.01) |
|---|---|
| *B01D 53/78* | (2006.01) |
| *B01D 53/50* | (2006.01) |
| *B01D 53/56* | (2006.01) |
| *B01D 53/72* | (2006.01) |
| *C10G 27/04* | (2006.01) |

(52) U.S. Cl.
CPC ............. *B01D 53/76* (2013.01); *B01D 53/50* (2013.01); *B01D 53/56* (2013.01); *B01D 53/72* (2013.01);

(Continued)

(58) Field of Classification Search
CPC ........ B01D 53/50; B01D 53/56; B01D 53/72; B01D 53/76; B01D 53/78; C10G 27/04;
(Continued)

(56) References Cited

U.S. PATENT DOCUMENTS

| 4,347,226 A | 8/1982 | Audeh et al. |
| 5,759,345 A * | 6/1998 | Bobik ................ D21C 11/0071 162/30.1 |

(Continued)

FOREIGN PATENT DOCUMENTS

CA          2948288 A1       11/2015

OTHER PUBLICATIONS

James F. Mcgehee, Mericon: A Practical Low Cost Solution to Spent Caustics Treating, Merichem website, downloaded Jan. 9, 2019.

(Continued)

*Primary Examiner* — Brian A McCaig (57) ABSTRACT

An integrated mercaptan extraction and/or sweetening and thermal oxidation and flue gas treatment process for a wide variety of sulfur, naphthenic, phenolic/cresylic contaminated waste streams is described. It provides comprehensive treatment for the safe disposal of sulfidic, naphthenic, phenolic/cresylic spent caustic streams, disulfide streams, spent air streams, spent mixed amine and caustic streams (also known as COS solvent streams) from sulfur treating processes. It allows the use of regenerated spent caustic in the sulfur oxide removal section of the thermal oxidation system reducing the need for fresh NaOH. It may also contain an integrated make-up water system. The integration allows the use of the liquefied petroleum gas or other hydrocarbon feeds to the respective extraction or sweetening process to offset external fuel gas requirements for the thermal oxidation system and for the push/pull system of the spent caustic surge drum and optional hydrocarbon surge drum.

20 Claims, 3 Drawing Sheets

(52) U.S. Cl.
CPC .............. *B01D 53/78* (2013.01); *C10G 27/04*
(2013.01); *C10G 2300/1003* (2013.01); *C10G 2300/202* (2013.01); *C10G 2300/207* (2013.01); *C10G 2300/4056* (2013.01); *C10G 2300/4081* (2013.01)

(58) Field of Classification Search
CPC ........ C10G 2300/202; C10G 2300/207; C10G 2300/1003; C10G 2300/4056; C10G 2300/4081
See application file for complete search history.

(56) References Cited

U.S. PATENT DOCUMENTS

| | | |
|---|---|---|
| 7,214,290 B2 | 5/2007 | Duesel, Jr. et al. |
| 7,223,332 B1 | 5/2007 | Tertel |
| 7,833,499 B2 | 11/2010 | Zang et al. |
| 10,399,852 B2 | 9/2019 | De Ren et al. |
| 2010/0122936 A1 | 5/2010 | Tertel et al. |
| 2018/0223197 A1 | 8/2018 | Al-Ghamdi et al. |

OTHER PUBLICATIONS

Kumfer, B., et al., Wet Air Oxidation Treatment of Spent Caustic in Petroleum Refineries, NPRA Annual Meeting, vol. 1, Mar. 21, 2010, Phoenix, AZ.

International search report from corresponding PCT application No. PCT/US2020/013681, dated Apr. 30, 2020.

Written Opinion from corresponding PCT application No. PCT/US2020/013681, dated Apr. 30, 2020.

\* cited by examiner

INTEGRATED MERCAPTAN EXTRACTION AND/OR SWEETENING PROCESSES COMBINED WITH THERMAL OXIDATION AND FLUE GAS TREATMENT

This application claims the benefit of U.S. Provisional Application Ser. No. 62/792,533, filed on Jan. 15, 2019, entitled INTEGRATED MERCAPTAN EXTRACTION AND/OR SWEETENING PROCESSES COMBINED WITH THERMAL OXIDATION AND FLUE GAS TREATMENT, which is incorporated herein in its entirety.

BACKGROUND

It is conventional practice at the present time to treat sour hydrocarbon and gas streams to remove mercaptans. Extraction processes are typically used when treating light hydrocarbons and gas streams for mercaptan removal. Mercaptans have traditionally been removed from hydrocarbon streams because of their malodorous scent.

Current sulfur sweetening and extraction technologies produce spent caustic streams which must be treated. For example, in a liquid-liquid extraction process, disulfides are removed from the hydrocarbon stream not to be returned. A liquid-liquid extraction process is generally described in G. A. Dziabis, Handbook of Petroleum Refining Processes 11.32 (Robert A. Meyers ed. 2003). In a typical extraction process, a hydrocarbon feed stream is sent to an extractor and contacted with a countercurrent flow of caustic. Mercaptans in the hydrocarbon stream react with the caustic to yield mercaptides, which are soluble in the caustic. The product stream passes overhead from the extraction column to storage or further treatment. The treated product may be sent to a sand filter vessel or water wash. A mercaptide rich caustic stream exits from the bottom of the extraction column. The mercaptide rich caustic stream is sent to an oxidizer for regeneration. Air and catalyst may be added to the mercaptide rich caustic stream before it enters the oxidizer. The mercaptides are oxidized to disulfides to regenerate the caustic solution. The effluent from the oxidizer is sent to a disulfide separator where it is separated into an air stream, a disulfide stream, and a regenerated caustic stream. The regenerated caustic is returned to the extractor. In some systems, there is a caustic prewash to remove $H_2S$ from the feed. In some systems, an additional step can be included before or after the extractor to remove carbonyl sulfide (COS) using a mixture of caustic and amines, such as monoethanolamine (MEA) or diethanolamine (DEA).

Similar processes produce naphthenic containing waste streams.

Sulfidic, naphthenic, phenolic/cresylic containing waste streams from these processes must be treated. Various processes have been developed for processing of such streams, but they have limitations. Furthermore, environmental regulations will continue to become more stringent, increasing the need for suitable processes.

Therefore, there is a need for a comprehensive process for treating sulfidic, naphthenic, phenolic/cresylic waste streams.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated $C_1$, $C_2$, $C_3$ . . . $C_n$ where "n" represents the number of carbon atoms in the one or more hydrocarbon molecules. Furthermore, a superscript "+" or "−" may be used with an abbreviated one or more hydrocarbons notation, e.g., $C_3^-$ or $C_3^-$, which is inclusive of the abbreviated one or more hydrocarbons. As an example, the abbreviation "$C_3^+$" means one or more hydrocarbon molecules of three carbon atoms and/or more. In addition, the term "stream" may be applicable to other fluids, such as aqueous and non-aqueous solutions of alkaline or basic compounds, such as sodium hydroxide.

As used herein, the term "zone" or "unit" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "mercaptan" means thiol and can include compounds of the formula RSH as well as salts thereof, such as mercaptides of the formula $RS^-M^+$ where R is a hydrocarbon group, such as an alkyl or aryl group, that is saturated or unsaturated and optionally substituted, and M is a metal, such as sodium or potassium.

As used herein, the term "disulfides" can include dimethyldisulfide, diethyldisulfide, and ethylmethyldisulfide, and possibly other species having the molecular formula RSSR' where R and R' are each, independently, a hydrocarbon group, such as an alkyl or aryl group, that is saturated or unsaturated and optionally substituted. Typically, a disulfide is generated from the oxidation of a mercaptan-tainted caustic and forms a separate hydrocarbon phase that is not soluble in the aqueous caustic phase. Generally, the term "disulfides" as used herein excludes carbon disulfide ($CS_2$).

As used herein, the weight percent or ppm of sulfur, e.g., "wppm-sulfur" is the amount of sulfur in a hydrocarbon stream, and not the amount of the sulfur-containing species unless otherwise indicated. As an example, methylmercaptan, $CH_3SH$, has a molecular weight of 48.1 with 32.06 represented by the sulfur atom, so the molecule is about 66.6%, by weight, sulfur. As a result, the actual sulfur compound concentration can be higher than the wppm-sulfur from the compound. An exception is that the disulfide content in caustic can be reported as the wppm of the disulfide compound.

As used herein, the term "regeneration" with respect to a solvent stream can mean removing one or more disulfide sulfur species from the solvent stream to allow its reuse in, e.g., a caustic treatment zone or a disulfide elimination zone.

DETAILED DESCRIPTION

The present invention provides an integrated mercaptan extraction and/or sweetening and thermal oxidation and flue gas treatment process for the complete treatment for a wide variety of sulfur, naphthenic, phenolic/cresylic contaminated waste streams. The thermal oxidation process operates near ambient pressure, which reduces the cost and corrosion potential compared to high pressure processes, such as wet air oxidation. In addition, there is no foaming problem with thermal oxidation technology. Moreover, as compared to other spent caustic treatment technologies like neutralization, thermal oxidation technology does not require large amounts of OSBL (outside battery limits) provided chemicals.

The integrated mercaptan extraction and/or sweetening and thermal oxidation process provides comprehensive treatment for the safe disposal of sulfidic, naphthenic, phenolic/cresylic spent caustic streams, disulfide streams, spent air streams, spent mixed amine and caustic streams (also known as COS solvent streams) from sulfur treating processes. The integrated mercaptan extraction and/or sweetening and thermal oxidation and flue gas treatment process allows the use of regenerated spent caustic from the mercaptan extraction and/or sweetening process in the sulfur oxide removal section of the thermal oxidation system reducing the need for fresh NaOH. Similarly, the integrated mercaptan extraction and/or sweetening and thermal oxidation and flue gas treatment process contains an integrated make-up water system for the mercaptan extraction and/or sweetening and thermal oxidation process. Furthermore, the integration allows the use of the liquefied petroleum gas (LPG) or other hydrocarbon feeds to the respective extraction or sweetening process to offset external fuel gas requirements for the thermal oxidation system and for the push/pull system of the spent caustic surge drum.

The integrated mercaptan extraction and/or sweetening and thermal oxidation and flue gas treatment process allows the use of an integrated control system for seamless operation of the mercaptan extraction and/or sweetening and thermal oxidation units to reduce utility usage, equipment size, and emissions. The close integration of the mercaptan extraction and/or sweetening and thermal oxidation system can also reduce the plot size.

The integrated mercaptan extraction and/or sweetening and thermal oxidation and flue gas treatment process can bring all emission permit requirements under one process designed to provide total compliance.

The integrated mercaptan extraction and/or sweetening and thermal oxidation and flue gas treatment process incorporates several new pieces of equipment. It utilizes a spent caustic surge drum to collect and store many different types of waste streams to be treated. Some of these streams are intermittent while others are continuous. The use of the spent caustic surge drum provides a stable and constant flow to the thermal oxidation section. The spent caustic surge drum allows the thermal oxidation section to convert the compounds in the various streams to environmental requirements regardless of the composition of the streams coming from the mercaptan extraction and/or sweetening section. The spent caustic surge drum operates with a push/pull system using the gas stream that is used to fuel the thermal oxidizer system. There is a gas stream into the spent caustic surge drum vessel and a gas stream out of the vessel to maintain a constant pressure. When the pressure is high, gas will be pushed out of the vessel, while it will be pulled into the vessel when the pressure is low. In addition, there is a make-up water injection to the spent caustic surge drum to control the concentration of the spent caustic which is sent to the thermal oxidation system to obtain maximized system uptime.

The integrated mercaptan extraction and/or sweetening and thermal oxidation and flue gas treatment process also includes a hydrocarbon surge drum which collects and holds the disulfide oil stream from the mercaptan removal unit. The hydrocarbon surge drum also operates on a push/pull basis. The use of the hydrocarbon surge drum provides a stable and constant flow to the thermal oxidation system.

The spent caustic surge drum and the hydrocarbon surge drum can be sized so that the mercaptan extraction and/or sweetening sections can continue to operate when the thermal oxidation system is undergoing maintenance.

The integrated mercaptan extraction and/or sweetening and thermal oxidation and flue gas treatment process may include an evaporator which reduces/controls the water content of the spent wash water streams decreasing the fuel requirements for the thermal oxidation system.

In some embodiments, the integrated mercaptan extraction and/or sweetening and thermal oxidation and flue gas treatment process may eliminate several pieces of equipment typically found in the stand alone extraction process including the disulfide sand filter and associated pump for treating the product stream from the caustic regeneration section, the spent caustic degassing drum and associated pump for degassing the spent caustic streams before treatment, and the exhaust head for spent air diversion to atmosphere.

One aspect of the invention is an integrated mercaptan extraction and/or sweetening and thermal oxidation and flue gas treatment process for sulfur reduction in a hydrocarbon feed. In one embodiment, the process comprises: introducing a spent liquid stream into a spent caustic surge drum, the spent liquid comprising at least one of: a mixed amine and caustic stream from a mercaptan removal unit; a spent caustic stream from a mercaptan removal unit; a spent naphthenic caustic stream from a kerosene sweetening unit; a spent sulfidic, phenolic/cresylic caustic stream from a gasoline sweetening unit, or kerosene sweetening unit, or both; or a caustic waste stream from another process unit; passing a mixed spent caustic stream from the spent caustic surge drum to a thermal oxidation and quench section of a thermal oxidation system, the mixed spent caustic stream comprising at least one sulfur compound, the thermal oxidation system comprising the thermal oxidation and quench section, a particulate removal section, and a sulfur oxide removal section; oxidizing the at least one sulfur compound in the thermal oxidation and quench section forming oxidized sulfur particulate and carbonate particulate in flue gas; separating a portion of the oxidized sulfur particulate, or the carbonate particulate from the flue gas in the particulate removal section; converting a portion of the oxidized sulfur particulate in the sulfur oxide removal section by contacting the flue gas with caustic to form sodium sulfate or sulfite particulate; and removing a portion of one of more of: the oxidized sulfur particulate, or the carbonate particulate.

In some embodiments, the thermal oxidation system further comprises a combined nitrogen oxide removal section and dioxin/furans destruction section, and wherein the process further comprises: introducing the flue gas from the sulfur oxide removal section to the combined nitrogen oxide removal section and dioxin/furans destruction section and at least one of: removing any dioxin or furan compounds in the flue gas from the sulfur oxide removal section, or reducing NOx to $N_2$ to form treated gases; and venting the treated gases from a stack.

In some embodiments, the process further comprises: introducing a disulfide oil stream from the mercaptan removal unit into a hydrocarbon surge drum, the disulfide oil stream comprising disulfides and/or wash oil/solvent and caustic; introducing a sulfurous hydrocarbon stream from the hydrocarbon surge drum into the thermal oxidation and quench section; and optionally introducing a waste hydrocarbon stream from a process unit into the hydrocarbon surge drum.

In some embodiments, the process further comprises: introducing a spent caustic stream from the hydrocarbon surge drum into the spent caustic surge drum.

In some embodiments, the process further comprises: introducing spent air from a disulfide separation vessel in the mercaptan removal unit into a spent air knockout drum; introducing a spent caustic stream from the spent air knockout drum into the spent caustic surge drum; and optionally introducing an additional spent air stream from a process unit into the spent air knockout drum.

In some embodiments, the process further comprises: introducing a spent air stream from the spent air knockout drum into the thermal oxidation and quench section.

In some embodiments, the process further comprises: introducing combustion air into the thermal oxidation and quench section or into the combined nitrogen oxide removal section and dioxin/furans destruction section, or both.

In some embodiments, the process further comprises: one or more of: introducing a first spent water stream from the mercaptan removal unit into an evaporator, the first spent water stream comprising water and one or more of caustic, or an amine compound; or introducing a second spent water stream from the kerosene treating unit, the second spent water stream comprising at least water and brine; and removing water from at least one of the first or second water streams to form an evaporated stream having a reduced amount of water; and introducing the evaporated stream into the spent caustic surge drum.

In some embodiments, heat for the evaporator comes from the thermal oxidation and quench section or an externally supplied heat source.

In some embodiments, the process further comprises: introducing at least one of liquefied petroleum gas, fuel gas, or waste gas into a fuel gas knockout drum; and introducing a fuel gas stream from the fuel gas knockout drum into at least one of the thermal oxidation and quench section or the combined nitrogen oxide removal section and dioxin/furans destruction section.

In some embodiments, the process further comprises: introducing a hydrocarbon stream from the fuel gas knockout drum into the hydrocarbon surge drum.

In some embodiments, the process further comprises: controlling a pressure in at least one of the spent caustic surge drum or the hydrocarbon surge drum in a push-pull system by introducing at least one of liquefied petroleum gas, fuel gas, or waste gas into the at least one of the spent caustic surge drum or the hydrocarbon surge drum; and sending excess liquefied petroleum gas, fuel gas, or waste gas to a fuel gas knockout drum.

In some embodiments, removing the portion of one or more of: the oxidized sulfur particulate, or the carbonate particulate comprises at least one of: removing at least a portion of the carbonate particulate from one or more of the thermal oxidation and quench section, the particulate removal section or the sulfur oxide removal section; or removing at least a portion of the oxidized sulfur particulate from one or more of the sulfur oxide removal section, or the thermal oxidation and quench section, or the particulate removal section.

In some embodiments, the process further comprises: introducing a makeup water stream into at least one of the spent caustic surge drum, the thermal oxidation and quench section, or the sulfur oxide removal section; wherein the makeup water stream comprises a water stream from at least one of the mercaptan removal unit, the kerosene treating unit, or the gasoline treating unit.

In some embodiments, the process further comprises: introducing a caustic stream into the sulfur oxide removal section, wherein the caustic stream comes from at least one of the mercaptan removal unit, the kerosene treating unit, or the gasoline treating unit.

In some embodiments, the process further comprises: introducing at least one of: ammonia, urea, combustion air, or fuel gas into the combined nitrogen oxide removal section and dioxin/furans destruction section.

Another aspect of the invention is an integrated mercaptan extraction and/or sweetening and thermal oxidation and flue gas treatment process for sulfur reduction in a hydrocarbon feed. In one embodiment, the process comprising: introducing a spent liquid stream into a spent caustic surge drum, the spent liquid comprising at least one of: a mixed amine and caustic stream from a mercaptan removal unit; a spent sulfidic caustic stream from a mercaptan removal unit; a spent naphthenic caustic stream from a kerosene sweetening unit; a spent sulfidic, phenolic/cresylic caustic stream from a gasoline sweetening unit, or kerosene sweetening unit, or both; or a caustic waste stream from another process unit; passing a mixed spent caustic stream from the spent caustic surge drum to a thermal oxidation and quench section of a thermal oxidation system, the mixed spent caustic stream comprising at least one sulfur compound, the thermal oxidation system comprising the thermal oxidation and quench section, a particulate removal section, a sulfur oxide removal section, and a combined nitrogen oxide removal section and dioxin/furans destruction section; oxidizing the at least one sulfur compound in the thermal oxidation and quench section forming oxidized sulfur particulate and carbonate particulate in flue gas; separating a portion of the oxidized sulfur particulate, or the carbonate particulate from the flue gas in the particulate removal section; converting a portion of the oxidized sulfur particulate in the sulfur oxide removal section by contacting the flue gas with caustic to form sodium sulfate or sulfite particulate; and removing a portion of one of more of: the oxidized sulfur particulate, or the carbonate particulate from one or more of the thermal oxidation and quench section, or the sulfur oxide removal section; introducing the flue gas from the sulfur oxide removal section to the combined nitrogen oxide removal section and dioxin/furans destruction section and at least one of: removing any dioxin or furan compounds in the flue gas from the sulfur oxide removal section, or reducing NOx to $N_2$ to form treated gases; and venting the treated gases from a stack.

In some embodiments, the process further comprises: controlling a pressure in at least one of the spent caustic surge drum or the hydrocarbon surge drum in a push-pull system by introducing at least one of liquefied petroleum gas, fuel gas, or waste gas into the at least one of the spent caustic surge drum or the hydrocarbon surge drum; and sending excess liquefied petroleum gas, fuel gas, or waste gas to a fuel gas knockout drum.

In some embodiments, the process further comprises: introducing a disulfide oil stream from the mercaptan removal unit into a hydrocarbon surge drum, the disulfide oil stream comprising disulfides and/or wash oil/solvent and caustic; introducing a sulfurous hydrocarbon stream from the hydrocarbon surge drum into the thermal oxidation and quench section; optionally introducing a waste hydrocarbon stream from a process unit into the hydrocarbon surge drum;

and introducing a spent caustic stream from the hydrocarbon surge drum into the spent caustic surge drum.

In some embodiments, the process further comprises: introducing spent air from a disulfide separation vessel in the mercaptan removal unit into a spent air knockout drum; introducing a spent caustic stream from the spent air knockout drum into the spent caustic surge drum; optionally introducing an additional spent air stream from a process unit into the spent air knockout drum; and introducing a spent air stream from the spent air knockout drum into the thermal oxidation and quench section.

Figure 1:
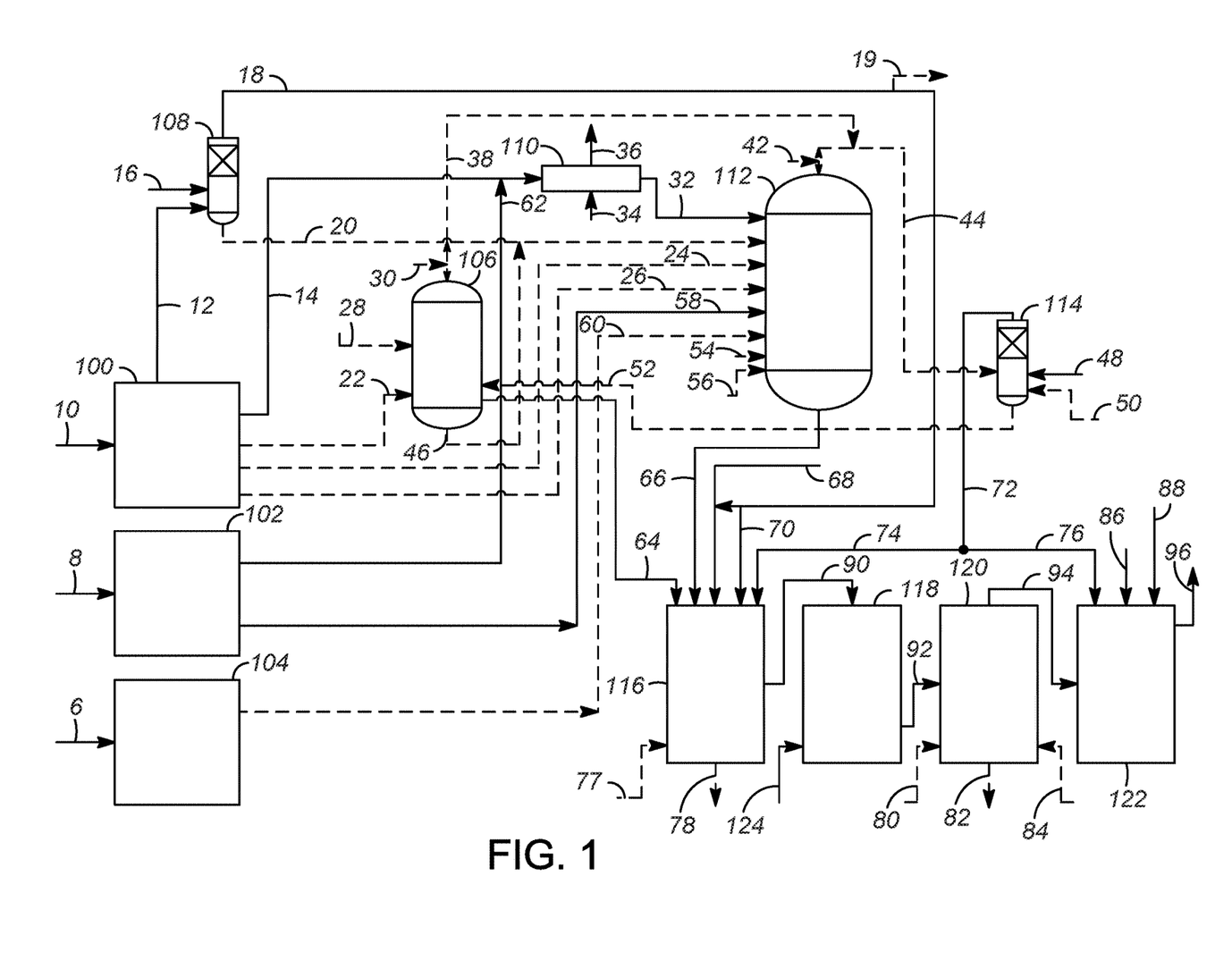
FIG. 1 illustrates one embodiment of the integrated mercaptan extraction and/or sweetening and thermal oxidation and flue gas treatment process of the present invention.

A general understanding of the integrated mercaptan extraction and/or sweetening and thermal oxidation and flue gas treatment process and apparatus of this invention can be obtained by reference to FIG. 1. FIG. 1 has been simplified by the deletion of a large number of apparatuses customarily employed in a process of this nature such as vessel internals, temperature and pressure controls systems, flow control valves, recycle pumps, etc. which are not specifically required to illustrate the performance of the subject process and apparatus. Furthermore, the illustration of the integrated mercaptan extraction and/or sweetening and thermal oxidation and flue gas treatment process of this invention in the embodiment of a specific drawing is not intended to limit the invention or to exclude other embodiments set out here, or reasonably expected modifications thereof. Lastly, although aqueous caustic is mentioned as the preferred reagent for converting sulfur compounds, other aqueous alkaline solutions are contemplated.

FIG. 1 illustrates one embodiment of the integrated mercaptan extraction and/or sweetening and thermal oxidation and flue gas treatment process of the present invention.

The process may include one or more of mercaptan removal unit 100, kerosene sweetening unit 102, and gasoline sweetening unit 104.

Feed stream 10 is sent to mercaptan removal unit 100 where it is processed to remove mercaptans using known processes, such as those disclosed in U.S. Pat. Nos. 5,862,060, 6,306,288, 7,223,332, 8,028,975, 8,173,856, 9,157,032, 9,394,188, 9,394,490, 9,422,483, 9,481,844, 9,522,861, 9,523,047, which are incorporated herein by reference. Feed stream 10 typically contains saturated or unsaturated LPG, propane, butane, pentane, or light naphtha range hydrocarbons. The mercaptan removal unit 100 will typically include one or more of the following pieces of equipment: caustic prewash, mercaptan extraction vessel, oxidation vessel, disulfide separation vessel, disulfide sand filter, vent tank, wash oil vessel or COS removal section. The mercaptan removal process may generate a variety of waste streams including spent caustic streams, and/or streams containing sulfur compounds. For example, there may be a mixed amine and caustic stream 24 and/or a spent sulfidic caustic stream 26. The mixed amine and caustic stream 24 may comprise a mixture of caustic and amine compounds. The spent sulfidic caustic stream 26 may comprise a mixture of caustic and sulfur compounds.

Feed stream 8 is sent to kerosene sweetening unit 102 where it is processed to sweeten kerosene using known processes. Feed stream 8 typically contains kerosene or jet fuel. In the kerosene sweetening process, the mercaptans in the feed are converted to disulfides using a fixed bed of catalyst. Fixed bed sweetening uses a reactor that contains a bed of activated charcoal impregnated with a mercaptan oxidation catalyst and wetted with caustic. The feed is combined with air and the mixture is sent through the catalyst bed where the mercaptans are oxidized to disulfides. The reactor effluent is sent to a settler where the treated hydrocarbon is separated from the caustic. Caustic is periodically circulated over the catalyst bed to wet the bed and maintain the desired alkalinity. No disulfide stream is produced. A prewash can be used in kerosene sweetening units to remove naphthenic acids from the feed producing naphthenic caustic. Some designs include a salt filter. The process is described in the Handbook of Petroleum Refining Processes at page 11.34.

The kerosene sweetening unit 102 will typically include one or more of the following pieces of equipment: electrostatic coalescer prewash, liquid-liquid coalescer prewash, reactor/caustic settler, water wash vessel, salt filter and clay filter. The kerosene sweetening process may generate a variety of waste streams including spent caustic streams, and/or streams containing sulfur compounds. For example, there may be a spent naphthenic caustic stream 58. The spent naphthenic caustic stream 58 may comprise a mixture of caustic and naphthenes.

Feed stream 6 is sent to gasoline sweetening unit 104 where it is processed to sweeten gasoline using known processes. Feed stream 6 is typically gasoline range material, such as full boiling range naphtha, light naphtha, medium naphtha, or heavy naphtha. In the naphtha/gasoline sweetening process, there is a small, continuous injection of weak alkali solution into the catalyst bed. A prewash can be used to remove $H_2S$ thus producing sulfides. The process can also include a sand filter. Some phenols will also be removed by the caustic. The caustic can be sulfidic, phenolic/cresylic, or a combination of both. These processes are described in the Handbook of Petroleum Refining Processes at pages 11.34-11.35.

The gasoline sweetening unit 104 will typically include one or more of the following pieces of equipment: caustic prewash, a reactor, and a sand filter. The gasoline sweetening process may generate a variety of waste streams including spent caustic and/or sulfur containing compounds. For example, there may be a spent sulfidic/phenolic/cresylic caustic stream 60. The spent sulfidic/phenolic/cresylic caustic stream 60 may comprise a mixture of caustic, sulfur compounds, phenolic/cresylic compounds. The spent sulfidic/phenolic/cresylic caustic stream 60 could be a single stream; alternately, there could be two or more streams having different compositions.

Waste streams from the mercaptan removal unit 100, the kerosene sweetening unit 102, and/or the gasoline sweetening unit 104 can be sent to a spent caustic surge drum 112. For example, one or more of the following streams could be sent to the spent caustic surge drum: mixed amine and caustic stream 24, spent sulfidic caustic stream 26, spent naphthenic caustic stream 58, or spent sulfidic/phenolic/cresylic caustic stream 60. The spent caustic surge drum may contain one or more of the following components: $Na_2S$, NaHS, NaOH, acid oils, MEA, DEA, COS, $CS_2$, $Na_2CO_3$, $Na_2SO_3$, $Na_2SO_4$, NaCl, $NaHCO_3$, phenols, sodium mercaptides (RSNa), mercaptans (RSH), sodium naphthenates, sodium phenolates, $H_2O$, diethanol urea.

In some embodiments, there could be a spent air stream 12 from a disulfide separation vessel in the mercaptan removal unit 100. The spent air stream 12 can be sent to a spent air knockout drum 108 optionally along with additional spent air streams 16 from other process units. The additional spent air streams could come from process units including, but not limited to, kerosene treating units and gasoline treating units, or other spent air streams in the refinery or complex. The spent air stream 12 additional spent air streams 16 (if any) are separated into a spent air stream 18 and a spent caustic stream 20 in the spent air knockout drum 108. The spent air stream 18 from the spent air knockout drum 108 can be treated with carbon if necessary and released to the atmosphere through line 19 in some embodiments. The spent caustic stream 20 from the spent air knockout drum 108 can be sent to the spent caustic surge drum 112.

In some embodiments, there can be spent water streams from one or more of the mercaptan removal unit 100, or the kerosene sweetening unit 102. The spent water stream 14 can include one of more of amine compounds, or caustic from a water wash vessel in the mercaptan removal unit 100. The spent water stream 62 can be a brine solution from the water wash and/or the sand filter in the kerosene sweetening unit 102. The spent water stream 14 and/or the spent water stream 62 can be sent to an evaporator 110. The heat 34 introduced into the evaporator 110 removes water vapor 36. In some embodiments, the heat for evaporator 110 can come from the thermal oxidation system described below. Other heat sources could also be used. The concentrated spent water stream 32 can be sent to the spent caustic surge drum 112.

In some embodiments, there can be a disulfide oil stream 22 from the mercaptan removal unit 100. The disulfide oil stream 22 can contain disulfides and/or wash oil/solvent and caustic from a disulfide separation vessel in the mercaptan removal unit 100. Wash oil is used to reduce the amount of disulfides in the regenerated caustic. Sources of wash oil include, but are not limited to, hydrotreated kerosene, hydrotreated heavy naphtha, hydrotreated full boiling range naphtha, hydrotreated light naphtha, reformate, alkylate, light straight run naphtha treated for mercaptan oxidation, and light fluid catalytic cracked naphtha treated for mercaptan oxidation.

The disulfide oil stream 22 can be sent to a hydrocarbon surge drum 106, optionally along with additional waste hydrocarbon streams 28 from other process units. The disulfide oil stream 22 and any additional waste hydrocarbon streams 28 (if any) are separated in the hydrocarbon surge drum 106 into a spent caustic stream 46 and a sulfurous hydrocarbon stream 64. The spent caustic stream 46 can be sent to spent caustic surge drum 112.

In some embodiments, one or more spent caustic streams 54 from other process units can be sent to spent caustic surge drum 112.

In some embodiments, one or more water streams 56 from the mercaptan removal unit 100, the kerosene sweetening unit 102, and/or the gasoline sweetening unit 104 can be introduced directly into the spent caustic surge drum 112 without being sent to the evaporator 110.

A mixed spent caustic stream 66 from the spent caustic surge drum 112 is sent to a thermal oxidation system. The pressure of the spent caustic surge drum 112 is controlled using a push/pull system, allowing spent caustic to flow to the thermal oxidation system. The pressure in the spent caustic surge drum 112 is controlled by introducing at least one of liquefied petroleum gas, fuel gas, or waste gas into the spent caustic surge drum 112 through line 42. Excess liquefied petroleum gas, fuel gas, or waste gas is sent to a fuel gas knock out drum 114 through line 44. Such push/pull systems are well known in the art.

Similarly, the pressure in the hydrocarbon surge drum 106 is controlled using a push/pull system by introducing at least one of liquefied petroleum gas, fuel gas, or waste gas into the hydrocarbon surge drum 106 through line 30. Excess liquefied petroleum gas, fuel gas, or waste gas is sent to a fuel gas knock out drum 114 through lines 38 and 44. Condensed liquid hydrocarbons from the bottom of the fuel gas knockout drum can be sent to the hydrocarbon surge drum 106 through line 52.

Liquefied petroleum gas, fuel gas, or waste gas is introduced into the fuel gas knockout drum through line 48. Additional waste gas from other process units can be introduced into the fuel gas knockout drum through line 50.

The mixed spent caustic stream 66 from the spent caustic surge drum 112 is sent to a thermal oxidation and quench section 116 of a thermal oxidation system. The thermal oxidation system comprises the thermal oxidation and quench section 116, a particulate removal section 118, a sulfur oxide removal section 120, and optionally a combined nitrogen oxide removal section and dioxin/furans destruction section 122.

Sulfurous hydrocarbon stream 64 from the hydrocarbon surge drum 106 can be sent to the thermal oxidation and quench section 116 in some embodiments.

Fuel gas from the fuel gas knock out drum 114 can be sent to the thermal oxidation and quench section 116 through lines 72 and 74. The fuel gas in line 74 and combustion air 68 are sent to the thermal oxidation and quench section 116 for combustion of the mixed spent caustic stream 66 and optionally the sulfurous hydrocarbon stream 64. Optionally spent air stream 18 from the spent air knockout drum 108 can be introduced into the thermal oxidation and quench section 116 either directly through line 70 or by mixing with combustion air 68.

The mixed spent caustic stream 66 and the sulfurous hydrocarbon stream 64 (if present) are thermally oxidized in the thermal oxidation and quench section 116. The thermal oxidizer portion operates at a temperature in the range of 800-1300° C. with a residence time between 0.5 and 2 seconds. The optional selective non-catalytic reduction (SNCR) section which may be present in some cases would operate at a temperature in the range of 800-1000° C. with a residence time between 0.2 and 1 seconds. The thermal oxidation step would be separated from the SNCR step via a choke wall in the vessel. The sodium ions react with $CO_2$ and $O2$ from the combustion of the hydrocarbons to form sodium oxide, and carbonate particulate, including, but not limited to, $Na_2O$, $Na_2CO_3$ and $NaHCO_3$ (and its hydrates). The $NaHCO_3$ may be further converted to $Na_2CO_3$. The sulfides from the spent caustic feed are converted to oxidized sulfur particulate including, but not limited to, $SO_2$ and $SO_3$. The formed flue gases flow to the quenching section where the temperature of the flue gas stream is reduced to the saturation temperature, and particulates are formed.

A portion of the oxidized sulfur particulate and/or the carbonate particulate can be removed from the thermal oxidation and quench section 116 through line 78.

The flue gas from the thermal oxidation and quench section 116 is sent to the particulate removal section 118 through line 90. The gaseous materials are mixed with aqueous caustic 124 to separate particulate from the gaseous material. Suitable particulate removal units are known in the art and include, but are not limited to, WESP (Wet Electrostatic Precipitator), venturi scrubbers, and the like, as known in the art.

The flue gas mixed with particulate from the particulate removal section 118 is sent to the sulfur oxide removal section 120 through line 92. A caustic stream 84 is introduced into the sulfur oxide removal section 120 near the top, flows downward, and contacts the flue gas from the particulate removal section 118. The packed bed removes $SO_2$ and $SO_3$ from the flue gas by converting it to sodium salts. The presence of $Na_2CO_3$ and $NaHCO_3$, which were formed upstream in the thermal oxidation and quench section 116, helps with obtaining an alkalinity solution, thereby substantially reducing the NaOH make-up requirement in the sulfur oxide removal section 120. Reactions take place in the sulfur oxide removal section 120 leading to the formation and/or conversion of sodium sulfate or sulfite particulate, including, but not limited to, $Na_2SO_3$, $Na_2SO_4$, and $NaHSO_3$. Neutral sodium salts (and potentially some solids) can be removed from the sulfur oxide removal section 120 through line 82.

If there are any halogens present in the feed, this may result in the formation of dioxin and/or furans. These compounds must be removed before the gases can be vented to the atmosphere. Therefore, in some embodiments, the flue gas from the sulfur oxide removal section 120 is sent to the combined nitrogen oxide removal section and dioxin/furans destruction section 122 through line 94. Fuel gas from the fuel gas knock out drum 114 can be sent to the combined nitrogen oxide removal section and dioxin/furans destruction section 122 through lines 72 and 76. Fuel gas in line 76 and combustion air 88 are sent to the combined nitrogen oxide removal section and dioxin/furans destruction section 122 for combustion. An ammonia and/or urea stream 86 can be introduced into the combined nitrogen oxide removal section and dioxin/furans destruction section 122. Any dioxin or furan compounds in the flue gas from the sulfur oxide removal section are removed and/or NOx is reduced to $N_2$ to form a treated gas. The treated gas 96 can be vented from a stack in the combined nitrogen oxide removal section and dioxin/furans destruction section 122.

Make-up water 77 can be sent to the thermal oxidation and quench section 116 and/or make-up water 80 can be sent to the sulfur oxide removal section 120. The make-up water 77 and 80 can be obtained from one or more of the mercaptan removal unit 100, the kerosene sweetening unit 102, or the gasoline sweetening unit 104.

EXAMPLE

Figure 2:
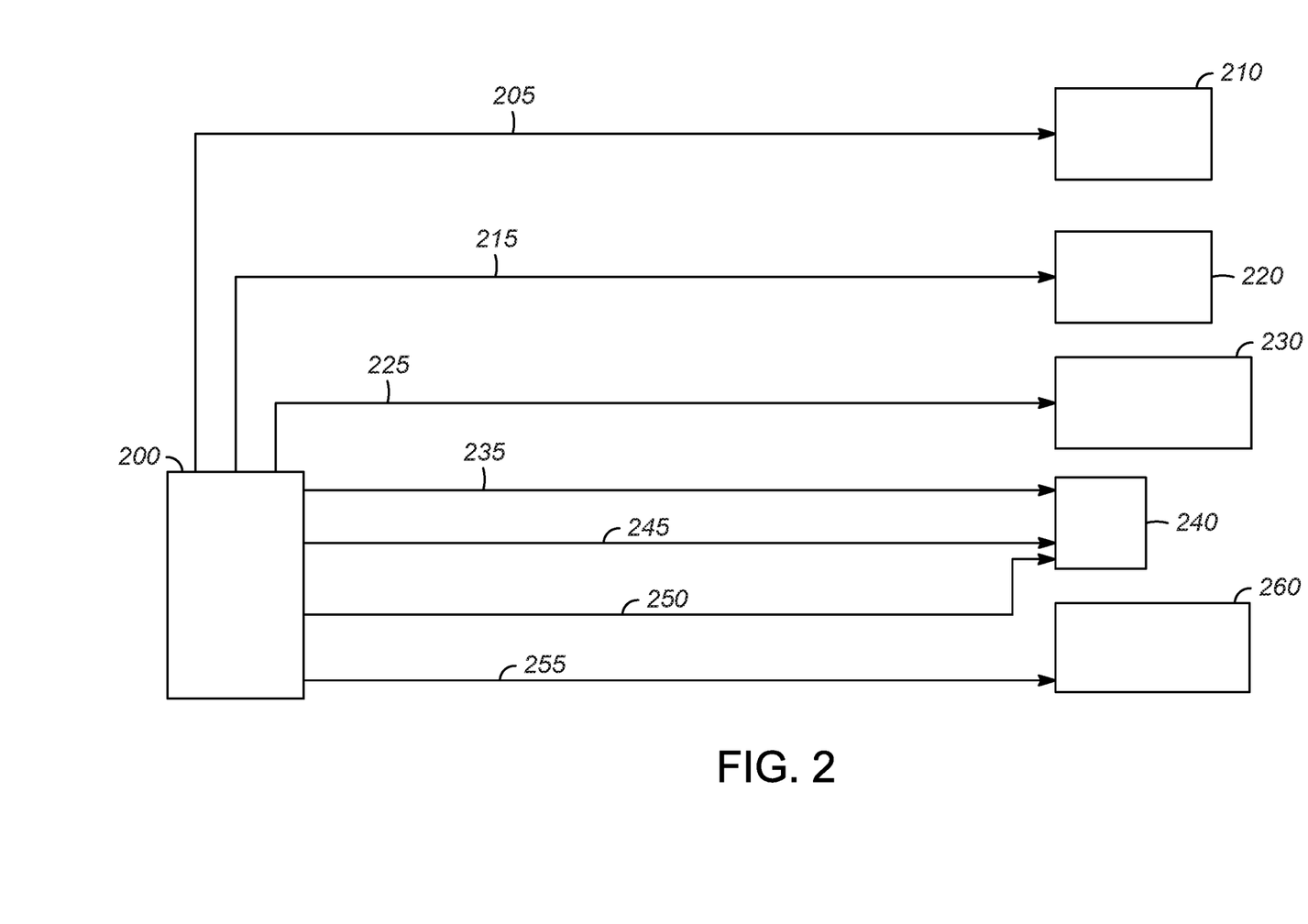
FIG. 2 illustrates an example of the various streams coming from a mercaptan removal unit and treatments for each stream for a prior art process.

FIG. 2 is an illustration of a typical mercaptan removal unit (MRU) 200 showing a number of waste streams which require separate processing. In most cases, the treatment of the various streams will be site dependent, For example, spent air stream 205 comes from the disulfide separation vessel and/or vent tank in the MRU and has about 1-2% sulfur. The spent air stream 205 can be sent to a treatment unit 210, which can be the firebox of a fired heater, vented to the atmosphere, or sent to a carbon canister. In some cases, further SOx emissions treatment is needed, The disulfide oil stream 215 contains disulfides and/or wash oil/solvent and caustic and comes from the disulfide separation vessel. The disulfide oil stream 215 could be sent to unit 220 as feed for a hydrotreater, a catalytic cracker, or a thermal cracker, it could be blended with fuel oil products, or it could be disposed of by licensed waste handlers.

The spent caustic stream 225 contains sulfidic, naphthenic, and/or phenolic/cresylic caustic. The spent caustic stream could be from a prewash unit or the extractor. The spent caustic stream could be subjected to treatment in unit 230, such as wet air oxidation, neutralization, chemical oxidation, incineration, dilution, or disposal by licensed waste handlers.

The condensate stream 235 comes from the caustic heater and can be treated in a waste water treatment unit 240. The backwash water stream 245 from the sand filter can also be treated in the waste water treatment unit 240. The spent water stream 250 from the water wash can be treated in the waste water treatment unit 240 as well.

The spent solution stream 255 from a COS removal section can be sent to treatment unit 260, such as a spent amine sump system, or a spent caustic disposal system.

Figure 3:
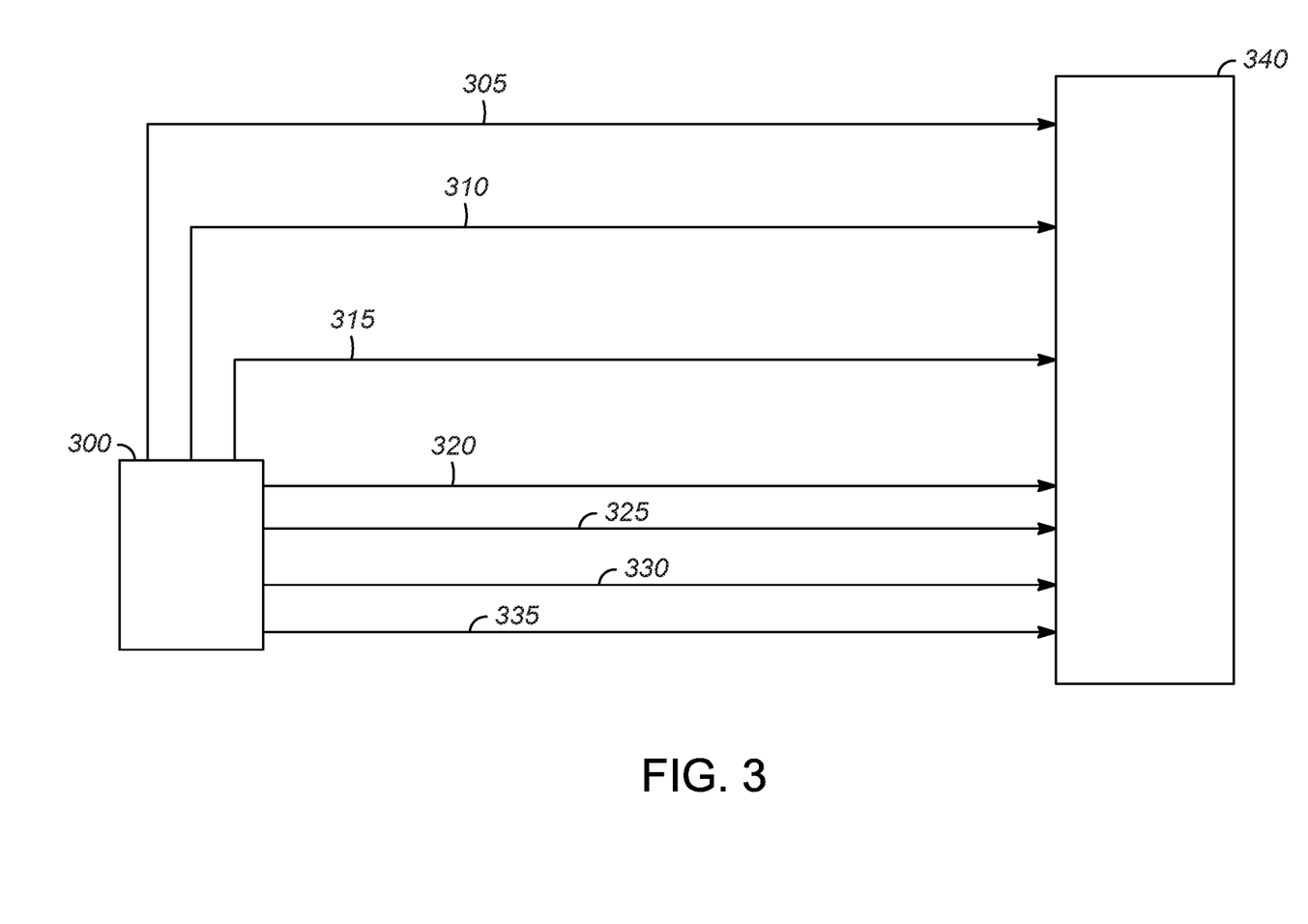
FIG. 3 illustrates an example of the various streams coming from a mercaptan removal unit and treatment in the process of the present invention.

In contrast, FIG. 3 illustrates how thermal oxidation system can be used to treat all of the streams from the MRU 300. The spent air stream 305, the disulfide oil stream 310, the spent caustic stream 315, the condensate stream 320, the backwater wash stream 325, the spent water stream 330, and the spent solution stream 335 can all be sent to the thermal oxidation system 340 where they are treated. As discussed above, the thermal oxidation system includes a thermal oxidation and quench section, a particulate removal section, and a sulfur oxide removal section, and optionally a combined nitrogen oxide removal section and dioxin/furans destruction section.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

SPECIFIC EMBODIMENTS

While the following is described in conjunction with specific embodiments, it will be understood that this description is intended to illustrate and not limit the scope of the preceding description and the appended claims.

A first embodiment of the invention is an integrated mercaptan extraction and/or sweetening and thermal oxidation and flue gas treatment process for sulfur reduction in a hydrocarbon feed comprising introducing a spent liquid stream into a spent caustic surge drum, the spent liquid comprising at least one of a mixed amine and caustic stream from a mercaptan removal unit; a spent caustic stream from a mercaptan removal unit; a spent naphthenic caustic stream from a kerosene sweetening unit; a spent sulfidic, phenolic/cresylic caustic stream from a gasoline sweetening unit, or kerosene sweetening unit, or both; or a caustic waste stream from another process unit; passing a mixed spent caustic stream from the spent caustic surge drum to a thermal oxidation and quench section of a thermal oxidation system, the mixed spent caustic stream comprising at least one sulfur compound, the thermal oxidation system comprising the thermal oxidation and quench section, a particulate removal section, and a sulfur oxide removal section; oxidizing the at least one sulfur compound in the thermal oxidation and quench section forming oxidized sulfur particulate and carbonate particulate in flue gas; separating a portion of the oxidized sulfur particulate, or the carbonate particulate from the flue gas in the particulate removal section; converting a portion of the oxidized sulfur particulate in the sulfur oxide removal section by contacting the flue gas with caustic to form sodium sulfate or sulfite particulate; and removing a portion of one of more of the oxidized sulfur particulate, or the carbonate particulate. An embodiment of the invention is one, any or all of prior embodiments in this paragraph up through the first embodiment in this paragraph wherein the thermal oxidation system further comprises a combined nitrogen oxide removal section and dioxin/furans destruction section, and wherein the process further comprises; introducing the flue gas from the sulfur oxide removal section to the combined nitrogen oxide removal section and dioxin/furans destruction section and at least one of removing any dioxin or furan compounds in the flue gas from the sulfur oxide removal section, or reducing NOx to $N_2$ to form treated gases; and venting the treated gases from a stack. An embodiment of the invention is one, any or all of prior embodiments in this paragraph up through the first embodiment in this paragraph further comprising introducing a disulfide oil stream from the mercaptan removal unit into a hydrocarbon surge drum, the disulfide oil stream comprising disulfides and/or wash oil/solvent and caustic; introducing a sulfurous hydrocarbon stream from the hydrocarbon surge drum into the thermal oxidation and quench section; and optionally introducing a waste hydrocarbon stream from a process unit into the hydrocarbon surge drum. An embodiment of the invention is one, any or all of prior embodiments in this paragraph up through the first embodiment in this paragraph further comprising introducing a spent caustic stream from the hydrocarbon surge drum into the spent caustic surge drum. An embodiment of the invention is one, any or all of prior embodiments in this paragraph up through the first embodiment in this paragraph further comprising introducing spent air from a disulfide separation vessel in the mercaptan removal unit into a spent air knockout drum; introducing a spent caustic stream from the spent air knockout drum into the spent caustic surge drum; and optionally introducing an additional spent air stream from a process unit into the spent air knockout drum. An embodiment of the invention is one, any or all of prior embodiments in this paragraph up through the first embodiment in this paragraph further comprising introducing a spent air stream from the spent air knockout drum into the thermal oxidation and quench section. An embodiment of the invention is one, any or all of prior embodiments in this paragraph up through the first embodiment in this paragraph further comprising introducing combustion air into the thermal oxidation and quench section or into the combined nitrogen oxide removal section and dioxin/furans destruction section, or both. An embodiment of the invention is one, any or all of prior embodiments in this paragraph up through the first embodiment in this paragraph further comprising one or more of introducing a first spent water stream from the mercaptan removal unit into an evaporator, the first spent water stream comprising water and one or more of caustic, or an amine compound; or introducing a second spent water stream from the kerosene treating unit, the second spent water stream comprising at least water and brine; and removing water from at least one of the first or second water streams to form an evaporated stream having a reduced amount of water; and introducing the evaporated stream into the spent caustic surge drum. An embodiment of the invention is one, any or all of prior embodiments in this paragraph up through the first embodiment in this paragraph wherein heat for the evaporator comes from the thermal oxidation and quench section or an externally supplied heat source. An embodiment of the invention is one, any or all of prior embodiments in this paragraph up through the first embodiment in this paragraph further comprising introducing at least one of liquefied petroleum gas, fuel gas, or waste gas into a fuel gas knockout drum; and introducing a fuel gas stream from the fuel gas knockout drum into at least one of the thermal oxidation and quench section or the combined nitrogen oxide removal section and dioxin/furans destruction section. An embodiment of the invention is one, any or all of prior embodiments in this paragraph up through the first embodiment in this paragraph further comprising introducing a hydrocarbon stream from the fuel gas knockout drum into the hydrocarbon surge drum. An embodiment of the invention is one, any or all of prior embodiments in this paragraph up through the first embodiment in this paragraph further comprising controlling a pressure in at least one of the spent caustic surge drum or the hydrocarbon surge drum in a push-pull system by introducing at least one of liquefied petroleum gas, fuel gas, or waste gas into the at least one of the spent caustic surge drum or the hydrocarbon surge drum; and sending excess liquefied petroleum gas, fuel gas, or waste gas to a fuel gas knockout drum. An embodiment of the invention is one, any or all of prior embodiments in this paragraph up through the first embodiment in this paragraph wherein removing the portion of one or more of the oxidized sulfur particulate, or the carbonate particulate comprises at least one of removing at least a portion of the carbonate particulate from one or more of the thermal oxidation and quench section, the particulate removal section or the sulfur oxide removal section; or removing at least a portion of the oxidized sulfur particulate from one or more of the sulfur oxide removal section, or the thermal oxidation and quench section, or the particulate removal section. An embodiment of the invention is one, any or all of prior embodiments in this paragraph up through the first embodiment in this paragraph further comprising introducing a makeup water stream into at least one of the spent caustic surge drum, the thermal oxidation and quench section, or the sulfur oxide removal section; wherein the makeup water stream comprises a water stream from at least one of the mercaptan removal unit, the kerosene treating unit, or the gasoline treating unit. An embodiment of the invention is one, any or all of prior embodiments in this paragraph up through the first embodiment in this paragraph further comprising introducing a caustic stream into the sulfur oxide removal section, wherein the caustic stream comes from at least one of the mercaptan removal unit, the kerosene treating unit, or the gasoline treating unit. An embodiment of the invention is one, any or all of prior embodiments in this paragraph up through the first embodiment in this paragraph further comprising introducing at least one of ammonia, urea, combustion air, or fuel gas into the combined nitrogen oxide removal section and dioxin/furans destruction section.

A second embodiment of the invention is an integrated mercaptan extraction and/or sweetening and thermal oxidation and flue gas treatment process for sulfur reduction in a hydrocarbon feed comprising introducing a spent liquid stream into a spent caustic surge drum, the spent liquid comprising at least one of a mixed amine and caustic stream from a mercaptan removal unit; a spent sulfidic caustic stream from a mercaptan removal unit; a spent naphthenic caustic stream from a kerosene sweetening unit; a spent sulfidic, phenolic/cresylic caustic stream from a gasoline sweetening unit, or kerosene sweetening unit, or both; or a caustic waste stream from another process unit; passing a mixed spent caustic stream from the spent caustic surge drum to a thermal oxidation and quench section of a thermal oxidation system, the mixed spent caustic stream comprising at least one sulfur compound, the thermal oxidation system comprising the thermal oxidation and quench section, a particulate removal section, a sulfur oxide removal section, and a combined nitrogen oxide removal section and dioxin/furans destruction section; oxidizing the at least one sulfur compound in the thermal oxidation and quench section forming oxidized sulfur particulate and carbonate particulate in flue gas; separating a portion of the oxidized sulfur particulate, or the carbonate particulate from the flue gas in the particulate removal section; converting a portion of the oxidized sulfur particulate in the sulfur oxide removal section by contacting the flue gas with caustic to form sodium sulfate or sulfite particulate; and removing a portion of one of more of the oxidized sulfur particulate, or the carbonate particulate from one or more of the thermal oxidation and quench section, or the sulfur oxide removal section; introducing the flue gas from the sulfur oxide removal section to the combined nitrogen oxide removal section and dioxin/furans destruction section and at least one of removing any dioxin or furan compounds in the flue gas from the sulfur oxide removal section, or reducing NOx to $N_2$ to form treated gases; and venting the treated gases from a stack. An embodiment of the invention is one, any or all of prior embodiments in this paragraph up through the second embodiment in this paragraph further comprising controlling a pressure in at least one of the spent caustic surge drum or the hydrocarbon surge drum in a push-pull system by introducing at least one of liquefied petroleum gas, fuel gas, or waste gas into the at least one of the spent caustic surge drum or the hydrocarbon surge drum; and sending excess liquefied petroleum gas, fuel gas, or waste gas to a fuel gas knockout drum. An embodiment of the invention is one, any or all of prior embodiments in this paragraph up through the second embodiment in this paragraph further comprising introducing a disulfide oil stream from the mercaptan removal unit into a hydrocarbon surge drum, the disulfide oil stream comprising disulfides and/or wash oil/solvent and caustic; introducing a sulfurous hydrocarbon stream from the hydrocarbon surge drum into the thermal oxidation and quench section;

optionally introducing a waste hydrocarbon stream from a process unit into the hydrocarbon surge drum; and introducing a spent caustic stream from the hydrocarbon surge drum into the spent caustic surge drum. An embodiment of the invention is one, any or all of prior embodiments in this paragraph up through the second embodiment in this paragraph further comprising introducing spent air from a disulfide separation vessel in the mercaptan removal unit into a spent air knockout drum; introducing a spent caustic stream from the spent air knockout drum into the spent caustic surge drum; optionally introducing an additional spent air stream from a process unit into the spent air knockout drum; and introducing a spent air stream from the spent air knockout drum into the thermal oxidation and quench section.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. An integrated mercaptan extraction and/or sweetening and thermal oxidation and flue gas treatment process for sulfur reduction in a hydrocarbon feed comprising:
   introducing a spent liquid stream into a spent caustic surge drum, the spent liquid comprising at least one of:
   a mixed amine and caustic stream from a mercaptan removal unit;
   a spent caustic stream from a mercaptan removal unit;
   a spent naphthenic caustic stream from a kerosene sweetening unit; a spent sulfidic, phenolic/cresylic caustic stream from a gasoline sweetening unit, or kerosene sweetening unit, or both; or
   a caustic waste stream from another process unit;
   passing a mixed spent caustic stream from the spent caustic surge drum to a thermal oxidation and quench section of a thermal oxidation system, the mixed spent caustic stream comprising at least one sulfur compound, the thermal oxidation system comprising the thermal oxidation and quench section, a particulate removal section, and a sulfur oxide removal section;
   oxidizing the at least one sulfur compound in the thermal oxidation and quench section forming oxidized sulfur particulate and carbonate particulate in flue gas;
   separating a portion of the oxidized sulfur particulate, or the carbonate particulate from the flue gas in the particulate removal section;

converting a portion of the oxidized sulfur particulate in the sulfur oxide removal section by contacting the flue gas with caustic to form sodium sulfate or sulfite particulate; and removing a portion of one of more of: the oxidized sulfur particulate, or the carbonate particulate.

2. The process of claim 1 wherein the thermal oxidation system further comprises a combined nitrogen oxide removal section and dioxin/furans destruction section, and wherein the process further comprises;

introducing the flue gas from the sulfur oxide removal section to the combined nitrogen oxide removal section and dioxin/furans destruction section and at least one of: removing any dioxin or furan compounds in the flue gas from the sulfur oxide removal section, or reducing $NOx$ to $N_2$ to form treated gases; and venting the treated gases from a stack.

3. The process of claim 2 further comprising:
introducing at least one of: ammonia, urea, combustion air, or fuel gas into the combined nitrogen oxide removal section and dioxin/furans destruction section.

4. The process of claim 1 further comprising:
introducing a disulfide oil stream from the mercaptan removal unit into a hydrocarbon surge drum, the disulfide oil stream comprising disulfides and/or wash oil/solvent and caustic;
introducing a sulfurous hydrocarbon stream from the hydrocarbon surge drum into the thermal oxidation and quench section; and
optionally introducing a waste hydrocarbon stream from a process unit into the hydrocarbon surge drum.

5. The process of claim 4 further comprising:
introducing a spent caustic stream from the hydrocarbon surge drum into the spent caustic surge drum.

6. The process of claim 5 further comprising:
introducing a spent air stream from the spent air knockout drum into the thermal oxidation and quench section.

7. The process of claim 1 further comprising:
introducing spent air from a disulfide separation vessel in the mercaptan removal unit into a spent air knockout drum;
introducing a spent caustic stream from the spent air knockout drum into the spent caustic surge drum; and
optionally introducing an additional spent air stream from a process unit oxidation and quench section.

8. The process of claim 1 further comprising:
introducing combustion air into the thermal oxidation and quench section or into the combined nitrogen oxide removal section and dioxin/furans destruction section, or both.

9. The process of claim 1 further comprising:
one or more of:
introducing a first spent water stream from the mercaptan removal unit into an evaporator, the first spent water stream comprising water and one or more of caustic, or an amine compound; or
introducing a second spent water stream from the kerosene treating unit, the second spent water stream comprising at least water and brine; and
removing water from at least one of the first or second water streams to form an evaporated stream having a reduced amount of water; and introducing the evaporated stream into the spent caustic surge drum.

10. The process of claim 9 wherein heat for the evaporator comes from the thermal oxidation and quench section or an externally supplied heat source.

11. The process of claim 1 further comprising:
introducing at least one of liquefied petroleum gas, fuel gas, or waste gas into a fuel gas knockout drum; and
introducing a fuel gas stream from the fuel gas knockout drum into at least one of the thermal oxidation and quench section or the combined nitrogen oxide removal section and dioxin/furans destruction section.

12. The process of claim 11 further comprising:
introducing a hydrocarbon stream from the fuel gas knockout drum into the hydrocarbon surge drum.

13. The process of claim 1 further comprising:
controlling a pressure in at least one of the spent caustic surge drum or the hydrocarbon surge drum in a push-pull system by introducing at least one of liquefied petroleum gas, fuel gas, or waste gas into the at least one of the spent caustic surge drum or the hydrocarbon surge drum; and
sending excess liquefied petroleum gas, fuel gas, or waste gas to a fuel gas knockout drum.

14. The process of claim 1 wherein removing the portion of one or more of: the oxidized sulfur particulate, or the carbonate particulate comprises at least one of:
removing at least a portion of the carbonate particulate from one or more of the thermal oxidation and quench section, the particulate removal section or the sulfur oxide removal section; or
removing at least a portion of the oxidized sulfur particulate from one or more of the sulfur oxide removal section, or the thermal oxidation and quench section, or the particulate removal section.

15. The process of claim 1 further comprising:
introducing a makeup water stream into at least one of the spent caustic surge drum, the thermal oxidation and quench section, or the sulfur oxide removal section;
wherein the makeup water stream comprises a water stream from at least one of the mercaptan removal unit, the kerosene treating unit, or the gasoline treating unit.

16. The process of claim 1 further comprising:
introducing a caustic stream into the sulfur oxide removal section, wherein the caustic stream comes from at least one of the mercaptan removal unit, the kerosene treating unit, or the gasoline treating unit.

17. An integrated mercaptan extraction and/or sweetening and thermal oxidation and flue gas treatment process for sulfur reduction in a hydrocarbon feed comprising:
introducing a spent liquid stream into a spent caustic surge drum, the spent liquid comprising at least one of:
a mixed amine and caustic stream from a mercaptan removal unit;
a spent sulfidic caustic stream from a mercaptan removal unit;
a spent naphthenic caustic stream from a kerosene sweetening unit; a spent sulfidic, phenolic/cresylic caustic stream from a gasoline sweetening unit, or kerosene sweetening unit, or both; or
a caustic waste stream from another process unit;
passing a mixed spent caustic stream from the spent caustic surge drum to a thermal oxidation and quench section of a thermal oxidation system, the mixed spent caustic stream comprising at least one sulfur compound, the thermal oxidation system comprising the thermal oxidation and quench section, a particulate removal section, a sulfur oxide removal section, and a combined nitrogen oxide removal section and dioxin/furans destruction section;

oxidizing the at least one sulfur compound in the thermal oxidation and quench section forming oxidized sulfur particulate and carbonate particulate in flue gas;

separating a portion of the oxidized sulfur particulate, or the carbonate particulate from the flue gas in the particulate removal section;

converting a portion of the oxidized sulfur particulate in the sulfur oxide removal section by contacting the flue gas with caustic to form sodium sulfate or sulfite particulate; and removing a portion of one of more of: the oxidized sulfur particulate, or the carbonate particulate from one or more of the thermal oxidation and quench section, or the sulfur oxide removal section;

introducing the flue gas from the sulfur oxide removal section to the combined nitrogen oxide removal section and dioxin/furans destruction section and at least one of: removing any dioxin or furan compounds in the flue gas from the sulfur oxide removal section, or reducing $NO_x$ to $N_2$ to form treated gases; and venting the treated gases from a stack.

18. The process of claim 17 further comprising:

controlling a pressure in at least one of the spent caustic surge drum or the hydrocarbon surge drum in a push-pull system by introducing at least one of liquefied petroleum gas, fuel gas, or waste gas into the at least one of the spent caustic surge drum or the hydrocarbon surge drum; and sending excess liquefied petroleum gas, fuel gas, or waste gas to a fuel gas knockout drum.

19. The process of claim 17 further comprising:

introducing a disulfide oil stream from the mercaptan removal unit into a hydrocarbon surge drum, the disulfide oil stream comprising disulfides and/or wash oil/solvent and caustic;

introducing a sulfurous hydrocarbon stream from the hydrocarbon surge drum into the thermal oxidation and quench section;

optionally introducing a waste hydrocarbon stream from a process unit into the hydrocarbon surge drum; and introducing a spent caustic stream from the hydrocarbon surge drum into the spent caustic surge drum.

20. The process of claim 17 further comprising:

introducing spent air from a disulfide separation vessel in the mercaptan removal unit into a spent air knockout drum;

introducing a spent caustic stream from the spent air knockout drum into the spent caustic surge drum;

optionally introducing an additional spent air stream from a process unit into the spent air knockout drum; and introducing a spent air stream from the spent air knockout drum into the thermal oxidation and quench section.

* * * * *